April 28, 1964 J. W. BATTIN 3,131,354

TONE CONTROL RECEIVER CIRCUIT

Filed June 12, 1961 3 Sheets-Sheet 1

INVENTOR.
John W. Battin
BY Mueller & Aichele
Attys.

April 28, 1964 J. W. BATTIN 3,131,354

TONE CONTROL RECEIVER CIRCUIT

Filed June 12, 1961 3 Sheets-Sheet 2

INVENTOR.
John W. Battin

BY Mueller & Aichele

Attys.

April 28, 1964 J. W. BATTIN 3,131,354

TONE CONTROL RECEIVER CIRCUIT

Filed June 12, 1961 3 Sheets-Sheet 3

INVENTOR.
John W. Battin
BY Mueller & Aichele
Attys.

United States Patent Office 3,131,354
Patented Apr. 28, 1964

3,131,354
TONE CONTROL RECEIVER CIRCUIT
John W. Battin, Addison, Ill., assignor to Motorola, Inc., Chicago, Ill., a corporation of Illinois
Filed June 12, 1961, Ser. No. 116,330
8 Claims. (Cl. 325—466)

The present invention relates to communications receivers and, more particularly, to such receivers having a tone operated squelch circuit, the sensitivity of which is automatically varied between no-signal and on-signal conditions.

As a result of the extensive use of the radio frequency communications channels presently available, it has become a relatively common practice for more than one communication system to share a common radio channel. To help promote a degree of privacy, however, many such systems employ a selective calling provision to restrict audible communications to only those stations within the particular system operating from the same tone signal for coding purposes.

The selective calling provision may be in the form of a tone-operated squelch circuit in the receiver responding to a given audio tone signal that has been added to the carrier wave by a tone modulation circuit incorporated in the system's transmitters. Such a system is described and claimed in Patent No. 2,918,571, issued July 25, 1958 to Robert Peth, and assigned to Motorola, Inc., the assignee of the present application.

The receiver tone-operated squelch circuit may incorporate a frequency selective device, such as an electromechanical resonant reed, which is responsive to tone-coded signals whereby the receiver is rendered operative to translate the audio intelligence portion of the received carrier wave. In prior tone-operated squelch circuits, however, an inherent characteristic has been the intermittent false response of the incorporated frequency selective device in the no-signal condition on bursts of random noise energy occurring within its frequency range. To prevent such undesirable falsing, some squelch systems employ a variable level control for adjusting the sensitivity of the squelch circuit for a compromise between maximum sensitivity setting and some lower setting which would prevent such falsing. Other tone squelch systems provide protection against falsing by injecting signals of frequencies above the range of audio intelligence at the input of the tone amplifiers, thereby effectively reducing the output of the tone amplifiers within the frequency range of the frequency selective device. Such methods, however, result in a fixed reduction in the squelch circuit sensitivity to the desired tone signal which, in the on-signal condition, may very well prevent the receiver from operating at its maximum communications range as well as introducing an inherent susceptibility to intermittent interruption of operation due to possible signal "fade-outs" or "flutter."

Accordingly, it is an object of the present invention to provide a receiver with a tone operated squelch circuit wherein the overall sensitivity is automatically varied to optimize operation under various operating conditions.

Another object of the invention is to provide a tone operated squelch circuit in a communications receiver wherein the sensitivity of response is adjusted to prevent falsing on random noise energy during no-signal conditions and automatically readjusted to minimize the effects of signal fade-outs and extend the effective communication range of the receiver upon receivng the desired signal.

A feature of the present invention is the provision of a tone-operated squelch circuit in a communications receiver having a filter network and tone amplifying stages for applying signals at a predetermined level to a frequency responsive device, and wherein the filter network includes a high pass filter portion for injecting frequencies above the audio tone signal range to reduce the sensitivity of the squelch circuit a predetermined amount to prevent false response on noise components in the absence of a desired signal, and which filter portion is rendered inoperative when a signal is received.

Another feature is the provision of a communications receiver including a tone operated squelch circuit for selective calling and having a high frequency noise gating device therein whereby, upon reception of a desired signal those frequencies above the tone signal range are effectively by-passed at a point before the input to the tone amplifiers, thereby optimizing the squelch sensitivity by increasing the amplification level for signals within the control tone range.

A further feature is the provision of a diode gate, coupled to the high pass filter which is actuated by the conduction of the first audio amplifier to effectively bypass those frequencies passed by the high pass filter resulting in a substantial increase in the amplification level on frequencies within the control tone range.

The invention is illustrated in the drawings wherein.

In practicing the invention, a communications receiver is provided which is adapted for selective calling by a tone-operated squelch circuit. One of the audio amplifier stages of the receiver, normally biased non-conductive in the no-signal condition, is rendered operative by a switching device when a control potential is applied thereto. This control potential is developed by an electro-mechanical resonant reed mechanism, or other frequency selective device, in response to a given audio tone signal being applied from the tone operated squelch circuit.

The tone operated squelch circuit may include two stages of tone amplification, with the second stage further serving a limiting function to provide a constant level of drive signal to the frequency selective device. The tone amplifiers are fed by a filter network coupled to the output of the receiver discriminator. The network includes a low pass filter portion for passing signals within the frequency range of the frequency selective device, which may be between 100 and 300 cycles per second. The filter network also includes a high pass filter portion for passing a portion of those frequencies above the audio intelligence, i.e., above 3,000 cycles per second. By injecting the high frequencies passed by the high pass filter, it can be seen that the output level for those frequencies passed by the low pass filter section will be effectively reduced from what would obtain otherwise. This provides protection from false operation in the no-signal condition by reducing the random noise energy within the frequency range of the frequency selective device.

To overcome this reduced sensitivity during the reception of a desired signal, the tone operated squelch circuit may include a high frequency noise gate coupled between the high pass filter section and the output of the receiver first audio amplifier. When a desired tone is received such that the audio amplifier is rendered conductive, the coupling between the audio amplifier and the high frequency noise gate causes the output of the high pass filter section to be effectively by-passed before the injection at the input of the tone amplifiers. The removal of these high frequency components results in an increase in amplification on those signals within the frequency range of the frequency selective device which in turn increases the overall sensitivity of the tone operated squelch circuit to its maximum value.

Figure 1:
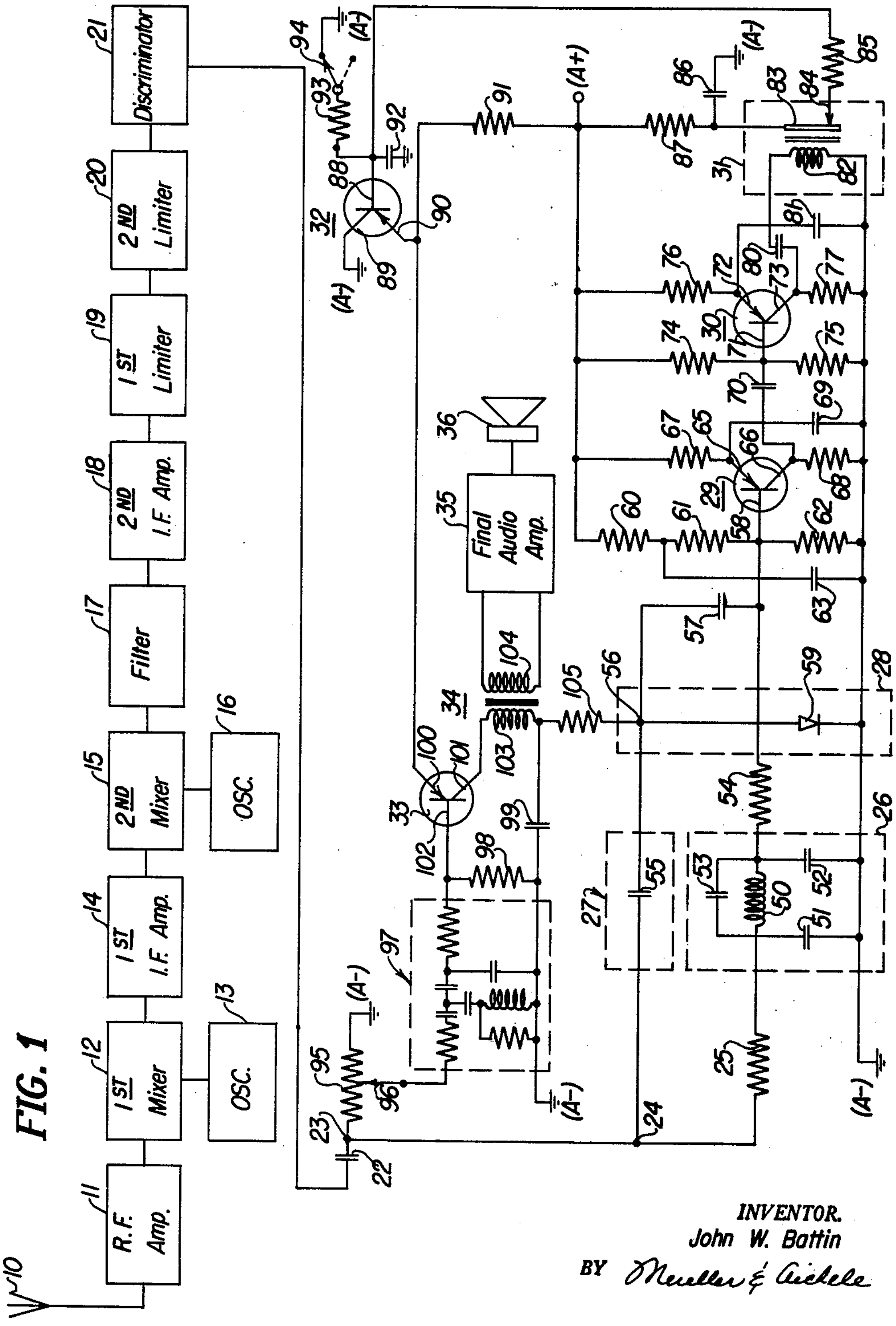
FIG. 1 is a block and schematic diagram of a receiver incorporated in the invention.

Considering a specific form of the invention, FIG. 1 shows the circuit arrangement of a receiver which includes the present invention. Radio signals picked up by antenna 10 are coupled to radio frequency amplifier 11 which selects and amplifies a desired signal and applies the same to first mixer 12 to which is also connected an oscillator 13. The received signal is heterodyned in first mixer 12 and converted to a signal of first intermediate frequency. This signal is further selected and amplified in first intermediate frequency amplifier 14 after which it is coupled to second mixer 15 to which oscillator 16 is also connected. The signal is further heterodyned and converted to a second intermediate frequency signal which is fed to filter 17 whereby high selectivity is provided for signals applied thereto. The signal thus selected is coupled to second intermediate frequency amplifier 18, where it is further amplified and applied successively to first and second limiters 19 and 20 respectively in order to remove substantially all amplitude variations thereof. The output of second limiter 20 is applied to the discriminator circuit 21 where the modulation portion of the signal is derived which may also include the coded audio tone signal. The derived audio intelligence plus any coded tone signals from discriminator 21 are coupled by way of capacitor 22 to junction point 23. The path from the junction point for the intelligence signals includes volume control 95 wherein arm 96 may be adjusted to provide a given portion of the derived signal. This is passed through high pass filter network 97 to the input of first audio amplifier 33. Network 97 consists of a series of resistor and capacitor components, connected in a well known manner to provide a frequency response whereby only those audio frequencies in the range utilized, such as 300 to 3,000 cycles per second, are passed, with those frequencies outside this range being substantially attenuated. The audio intelligence signals thus selected are amplified by first audio amplifier 33 and coupled through transformer 34 to the final audio amplifier 35, the output of which is used, as by application to loudspeaker 36 to provide an audible response, or in other utilization means.

Figure 2:
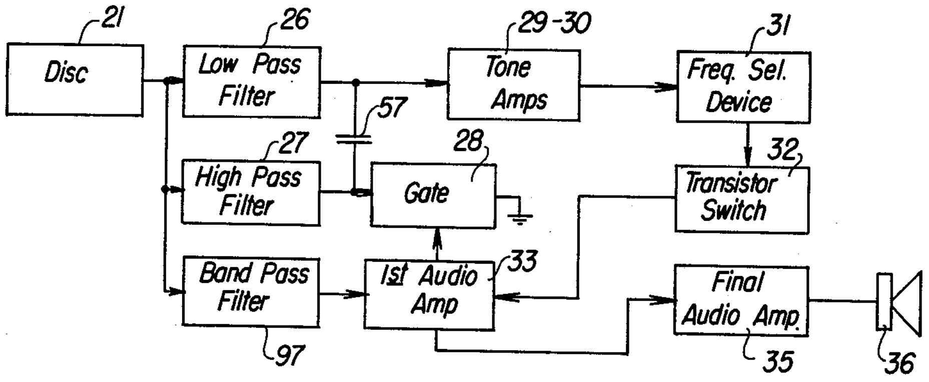
FIG. 2 is a partial block diagram of a receiver incorporating the invention.

The demodulated signals appearing at junction 23 are also coupled to a filter network which includes a low pass filter section 26 and a high pass filter section 27, as shown in FIGS. 1 and 2. Low pass filter 26 passes only those frequencies below 300 cycles per second, thereby providing conduction for the audio tone signals which may be in the range of 100–300 cycles per second. High pass filter 27 passes only those frequencies above 3,000 cycles per second. Signals are applied from the common junction 24 to low pass filter 26 and to high pass filter 27. The outputs thereof are combined on being coupled to the input of tone amplifier 29. Audio tone signals within the pass range of low pass filter 26 are thereby amplified to a fixed level and applied to resonant reed device 31. Accordingly, when an audio tone of the frequency at which resonant reed device 31 is resonant is translated, sympathetic contact closures occur such that transistor switch 32 is operative to render first audio amplifier 33 conductive to amplify and apply the audio intelligence signals applied from discriminator 21 to final audio amplifier 35 feeding loudspeaker 36. The conduction of first audio amplifier 33 further causes the actuation of high frequency noise gate 28 to effectively shunt the output of high pass filter 27 to ground as will be more fully explained.

The low pass filter 26 consists of resistor 25 in series with inductor 50 and shunted by capacitors 51, 52 and 53 with their values chosen such that frequencies above 300 cycles per second are effectively rejected. Resistor 54 provides the desired isolation between low pass filter 26 and tone amplifier stage 29. High pass filter 27 connected in parallel with low pass filter 26 consists of capacitor 55 whose value is selected such that a portion of those frequencies above 3,000 cycles per second are passed therethrough to point 56, through capacitor 57, to the input 58 of tone amplifier 29. The combined signals from low pass filter 26 and high pass filter 27 are amplified and coupled through coupling capacitor 70 to the input 71 of the second tone amplifier stage 30. Resistors 60, 61 and 62 form a fixed biasing arrangement for transistor stage 29, capacitor 63 provides the desired decoupling, resistor 67 is the emitter bias resistor and resistor 68 is the collector load resistor with capacitor 69 providing the required emitter bypass. Resistors 74 and 75 form the fixed bias arrangement for transistor stage 30; resistor 76 is the emitter bias resistor; and resistor 77 is the collector load resistor with capacitor 81 providing the necessary emitter bypass. The amplified signals from transistor stage 30 are applied through coupling capacitor 80 to coil 82 of resonant reed device 31.

If the proper tone frequency to which resonant reed device 31 responds is present, arm 83 will be driven as a vibrator at that particular frequency. The resultant voltage is applied through resistor 85 to input 88 of transistor switch 32 resulting in capacitor 92 being charged to a fixed value. This provides a bias such that transistor switch 32 is rendered non-conductive which in turn renders first audio amplifier 33 conductive by virtue of their emitter electrodes 90 and 100 being directly coupled. Filtered audio intelligence signals appearing at the input 102 of first audio amplifier 33 are amplified and applied to final audio amplifier 35, where they are further amplified and applied to loudspeaker 36. Upon conduction of first audio amplifier 33, current flows through transformer winding 103, through resistor 105 and through diode 59 to ground. With diode 59 conducting, point 56 is effectively connected to ground potential, thereby by-passing the output of high pass filter 27.

As seen in FIGS. 1 and 2, capacitor 57 prevents a like shunting action of the output of low pass filter 26 upon the conduction of diode 59. Thus it can be seen that in a no-signal condition, the input to transistor 29 includes both low frequency components from low pass filter 26 and high frequency components from high pass filter 27. When receiving a signal containing the proper tone frequency, the input to transistor 29 includes only the low frequency components from low pass filter 26 with the output of high pass filter 27 being by-passed to ground by the conduction of diode 59.

Figure 3:
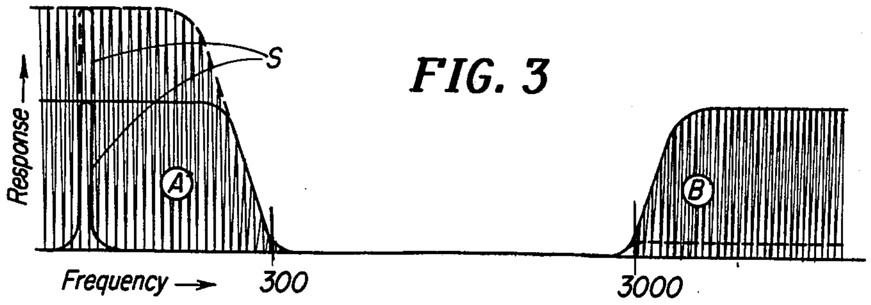
FIG. 3 is a graphic representation of the composite band pass characteristics of the tone filter network of a receiver in which the squelch sensitivity may be varied according to the provisions of the present invention.

Referring to FIG. 3, the band pass characteristics of filters 26 and 27 are graphically represented, with the solid line indicating the band pass characteristics of filters 26 and 27 in combination. The dotted line shows the resultant characteristics when the output of high pass filter 27 is by-passed to ground through high frequency noise gate 28. In the no-signal condition, both low frequencies from low pass filter 26, represented as portion A, and high frequencies from high pass filter 27, represented as portion B, are combined at the input of tone amplifiers 29—30. Accordingly, with the level of amplification being limited to a predetermined value by tone amplifiers 29—30, it can be readily seen that the inclusion of high frequencies at the input of tone amplifiers 29—30 effectively limits the amount of amplification provided for those frequencies passed by low pass filter 26. This fixed limit to the energy passed by low pass filter 26 effectively restricts the energy therefrom in which signals other than the particular signal to which the resonant reed 31 is tuned would have sufficient energy to cause false operation of the resonant reed device. As might be realized, however, this limit to the amplification of energy from the low pass filter 26 reduces the sensitivity of the receiver's response to tone signals at less than its optimum value. This has the effect of reducing the communications range at which the receiver might otherwise operate.

By providing high frequency noise gate 28, this undesirable reduction in sensitivity can be overcome by taking advantage of the intermittent contact closures made by the resonant reed device 31 under the aforementioned threshold conditions. These intermittent contact closures are caused by the random addition or subtraction of the tone signal and the low frequency noise present at the output of discriminator 21. When a weak signal with the proper tone is received, the first of these intermittent contact closures of the resonant reed device 31 actuates transistor switch 32 so that audio amplifier 33 is conductive. This in turn causes actuation of the noise gate 28. The high frequencies at the output of high pass filter 27 are therefore effectively by-passed to ground thereby permitting an increase in the amplification of the energy in the low frequency or control tone range such that the receiver operates at maximum sensitivity to the tone signals. It can be seen that use of this system of gating the high frequency noise results in minimum response to noise falsing while response to the desired signal is maintained at normal sensitivity.

Figure 4:
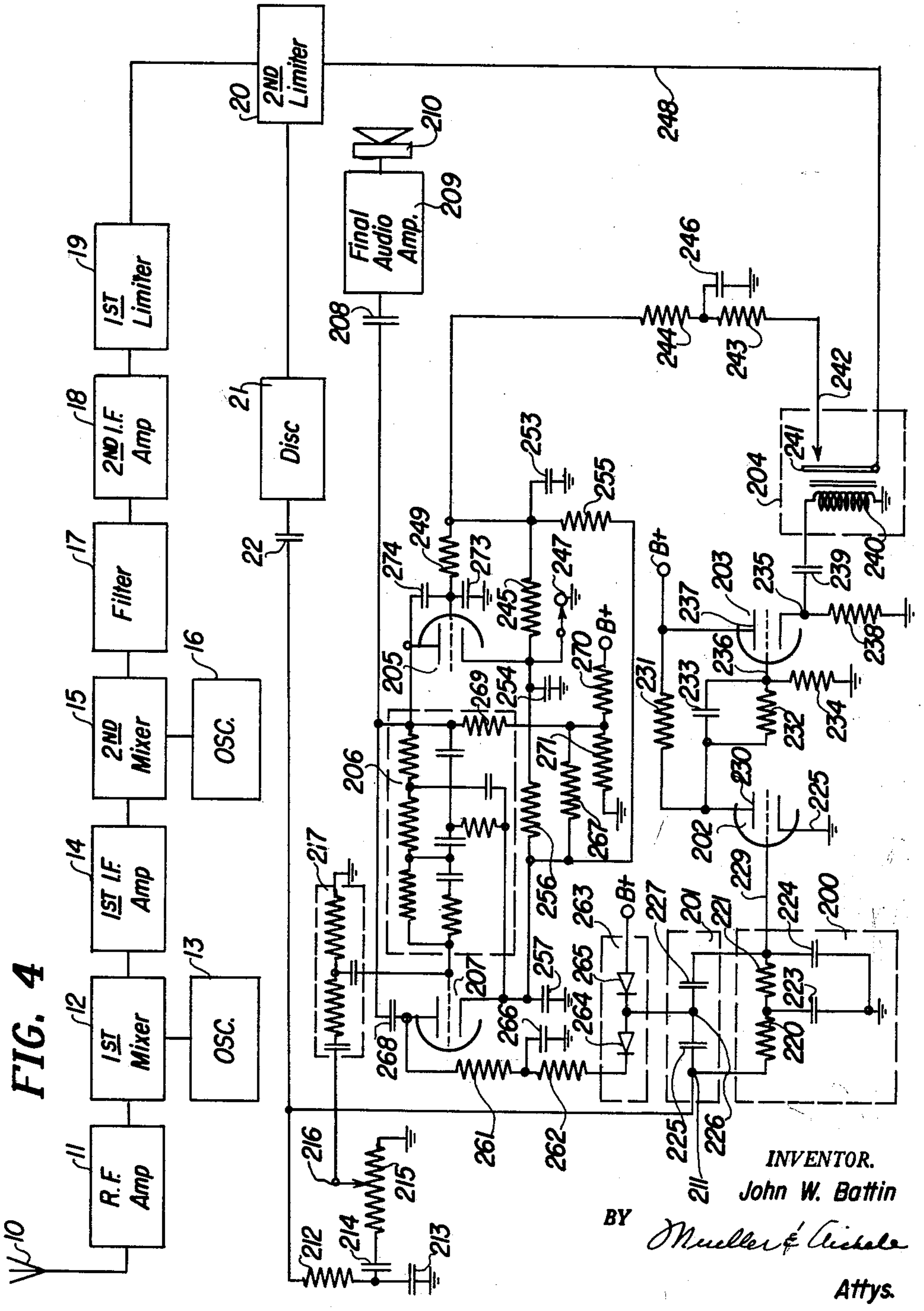
FIG. 4 is a block and schematic diagram of a tube type communications receiver incorporating another embodiment of the invention.

FIG. 4 shows a receiver of the type incorporating vacuum tubes which includes another embodiment of the invention. Portions of the receiver in FIG. 4 which function in the same manner as the receiver shown in FIG. 1 are given the same reference characters. In this form of a receiver, the demodulated audio, or voice signals, are coupled from the discriminator 21 through capacitor 22, resistor 212 of de-emphasis network 212—213, and capacitor 214 to volume control 215. The variable arm 216 of volume control 215 is coupled by way of RC network 217 to the control grid of the first audio amplifier 207. The signals which are amplified are then applied through coupling capacitors 268 and 208 to the final audio amplifier 209, and in turn to the loudspeaker 210. Filter network 206 acts to remove the tone signals from the audio output. Similar to the operation of FIG. 1, first audio amplifier 207 is rendered operative when control tube 205 is cut off and this is accomplished by the reception of a control tone to which the resonant device 204 is tuned.

The demodulated signals from the discriminator 21 are applied to the low pass filter 200 and, from the output of this filter, to the control grid 229 of tone amplifier 202. Low pass filter 200 comprises series connected resistors 220 and 221 and shunt connected capacitors 223 and 224. Capacitors 225 and 227, serially connected in parallel with low pass filter 200, form a high pass filter 201. The outputs of low pass filter 200 and high pass filter 201 are combined at the input of the tone amplifier 202.

The values of the components in the filter network 200—201 are chosen such that only those frequencies in the range up to approximately 300 cycles are passed by the low pass filter 200, with only those frequencies above 3,000 cycles being passed by the high pass filter 201. Audio intelligence signals within the range of 300 to 3,000 cycles are substantially rejected.

Tone amplifier 202 has a grounded cathode 225 with signals being applied to its grid 229 with respect to ground. Anode 230 is connected to B+ through load resistor 231. Anode 230 is also connected to resistors 232—234 which are series coupled to ground thereby forming a voltage divider network. The second amplifier stage 203 is coupled in a limiter type operation for driving the resonant reed device 204. The control grid 236 of this tube is conneced to the junction of resistors 232—234 and the anode 237 thereof is connected directly to B+. Cathode 235 is connected to ground through load resistor 238. Coil 240 of the resonant reed device 204 is coupled between ground and the cathode side of resistor 238 by means of blocking capacitor 239.

Control grid 236 of the limiter stage 203 is direct current coupled to the anode 230 of the tone amplifier stage 202. Capacitor 233 is connected across resistor 232 and, in the no-signal condition, limiter stage 203 will be biased according to its grid conduction and the bypass provided by cathode resistor 238. As signals are applied to this limiter drive stage, limiting action takes place and a fixed level of drive is applied to the resonant reed device 204, including frequencies within the control tone range as well as a portion of those frequencies above the audio intelligence range passed by high pass filter 201.

The potential to cut off control tube 205, whereby audio stage 207 is rendered operative, is derived from the receiver second limiter stage 20. This negative potential is applied from limiter stage 20 through lead 248 to contacts 241—242 of resonant reed device 204, and is developed across a resistive divider network consisting of resistors 243, 244 and 245, with resistor 245 being returned to ground through the switch 247. That portion of the negative potential appearing across resistor 245 is applied through the series resistor 249 to the control grid of direct current amplifier 205.

The cathode of control tube 205 is normally grounded through switch 247 with the anode thereof coupled through resistor 269 to a voltage divider network consisting of resistors 270 and 271 connected across the B+ potential source. Control tube 205 is thus rendered conductive until the negative voltage derived from resonant reed device 204 is applied to its control grid to cut it off. While control tube 205 is conductive, the voltage drop across resistor 269, acting through filter network 206, is sufficient to hold the control grid of first audio amplifier 207 below the potential supplied to its cathode through resistor 267 from the junction of resistors 270 and 271. As control tube 205 is rendered nonconductive, the potential at its anode will rise substantially to the value of the potential existing at the junction of resistors 270 and 271. Since the anode of tube 205 is coupled to the control grid of first audio amplifier 207 through the direct current path through filter network 206, the control grid will likewise rise, and will become more positive than the cathode such that tube 207 will be rendered conductive. Resistor 267 therefore provides a fixed cathode bias for first audio amplifier 207 and the value of the various circuit components are selected such that tube 207 is in a conductive state whenever there is no drop in resistor 269 and substantially the full potential at the junction of resistor 270 and 271 is applied to its control grid.

Series resistors 243, 244 and 249 together with bypass capacitors 246 and 253 form a filter network for the pulsating potential produced by contacts 241—242 of resonant reed device 204. Resistors 249, 255 and 256 form a grid leak path from the control grid to the cathode of control tube 205. Filter capacitor 257 connected from the cathode of tube 207 and ground serves to bypass any alternating currents.

Upon first audio amplifier 207 being rendered conductive, current flows in its plate circuit through the load resistors 261 and 262 and the high frequency noise gate 263 consisting of diodes 264 and 265. This conduction of current through diodes 264 and 265 effectively bypasses the common connection 226 between capacitors 225 and 227 thereby shunting the high frequency components passed by high pass filter 201. Accordingly, only the frequencies passed by low pass filter 200 are coupled to the input of tone amplifier 202, thereby increasing the amplification level provided for frequencies within the tone control range resulting in increased response sensitivity for the receiver.

It can therefore be seen that the present invention provides a simple, practical and effective method of optimizing receiver operation: in the no-signal condition by preventing false response on bursts of random noise energy falling within the frequency range of the control tone signals, and, in the on-signal condition by minimizing the effects of signal "fade-outs" which may cause intermittent interruptions in the transmitted voice messages which is accomplished by increasing the response sensitivity of the receiver whereby it operates at its maximum communications range.

I claim:

1. In a selective communications system, a receiver responsive to a carrier wave modulated by audio intelligence signals and by an audio tone signal, said receiver including in combination; a detector for deriving said audio intelligence and tone signals from said received carrier wave, audio amplifier means including circuit means to render the same operative to conduct intelligence signals only upon the application of a control potential thereto, and a tone operated squelch circuit including tone amplifying means, filter network means for applying signals to said tone amplifying means, said filter network means including a first portion having a low pass characteristic for passing said audio tone signals and a second portion for passing a portion of those frequencies above the range of said audio intelligence signals, means including a resonant reed device coupled to said tone amplifying means and operative to produce a control potential in response to a predetermined audio tone signal, means applying said control potential to said audio amplifying means to render the same conductive so that said audio intelligence is translated thereby, and noise gating means coupled between said second filter portion and a reference potential and further coupled to said audio amplifier, said tone amplifier means reducing the amplification of frequencies passed by said first filter portion in the presence of the frequencies above said audio intelligence signals from said second filter portion, said audio amplifying means when conducting actuating said high frequency gating means to bypass said frequencies passed by said second filter portion to said reference potential, whereby the level of frequencies passed by said first filter portion and applied by said tone amplifier means to said reed device, is increased.

2. In a selective communications system, a receiver responsive to a carrier wave modulated by audio intelligence and by a control tone signal, said receiver including in combination; means for demodulating said carrier wave including a discriminator for deriving the audio intelligence and the control tone signal, audio amplifying means for the demodulated intelligence which is operative when a control potential is applied thereto and inoperative in the absence of such control potential, and a tone operated squelch circuit including frequency selective means, high frequency noise gating means, tone amplifying means and filter network means, said filter network means being coupled between said discriminator and said tone amplifying means, said tone amplifying means applying signals to said frequency selective device, said filter network means including a first portion for passing signals of frequencies within the control tone signal range and a second portion for passing signals of frequencies above the range of the audio intelligence whereby amplification of signals passed by said first filter portion is effectively reduced in said tone amplifying means by signals passed by said second filter portion, said high frequency noise gating means being coupled between a reference potential and said audio amplifying means and further coupled to said second filter portion, said frequency selective device producing said control potential in response to a control tone signal of a predetermined level applied thereto, and means for applying said control potential to said audio amplifying means to render same conductive, said audio amplifying means when conducting causing actuation of said high frequency noise gating means to bypass signals passed by said second filter portion, thereby increasing the level of control tone signals in said tone amplifier means to thereby increase the sensitivity of said tone operated squelch circuit.

3. In a selective communications receiver responsive to a carrier wave modulated by audio intelligence signals accompanied by a control tone; means for demodulating said carrier wave including detection means for deriving said intelligence and control tone signals, audio amplifying means for the demodulated intelligence and which is operative only when a control potential is applied thereto and inoperative when said control potential is removed, and means for developing said control potential in response to said control tone signals, said means including tone amplifying and frequency selective means, filter network means coupled between said detection means and said tone amplifying means, said filter network having first and second sections, said first section passing frequencies within the control tone range and said second section passing frequencies above the range of said audio intelligence signals, said frequencies passed by said first and second filter sections being normally combined at said tone amplifying means, and high frequency noise gating means coupled between a reference potential and said audio amplifying means and further coupled to said second filter section, said tone amplifying means applying control tone signals passed by said first filter section to said frequency selective means at a fixed level of strength, said frequency selective means developing and applying said control potential to said audio amplifying means in response to a given control tone signal whereby said audio amplifying means is rendered conductive to translate said audio intelligence signals, said conduction of said audio amplifying means further causing said frequencies passed by said second filter section to be bypassed by the actuation of said high frequency noise gating means, whereby said amplification level of said control tone signal is increased in said tone amplifier means to increase the response sensitivity of said receiver.

4. In a selective communications receiver responsive to a carrier wave modulated by audio intelligence signals accompanied by an audio tone signal; means for demodulating said carrier wave including transistor detection means for deriving said audio intelligence and tone signals, transistor audio amplifier means including transistor switch means to render same operative to conduct audio intelligence signals only upon the application of a control potential thereto, and circuit means for developing and applying said control potential to said transistor switch means in response to said audio control tone, said circuit means including filter network means, transistor tone amplifying means, frequency selective means and diode gating means, said filter network being coupled between said transistor detection means and said transistor tone amplifying means and having first and second sections, said first filter section passing frequencies within the audio tone signal range and said second filter section passing frequencies above the range of said audio intelligence signals, said diode gating means being connected between said second filter section and ground and further coupled to said transistor audio amplifying means, said frequency selective device developing said control potential in response to said audio tone signals from said transistor tone amplifying means and applying same to said transistor switch means to render said transistor audio amplifying means conductive to translate said audio intelligence signals thereby, said conduction of said transistor audio amplifying means actuating said diode gating means to bypass said frequencies passed by said second filter section to ground, thereby increasing the amplification of said frequencies passed by said first filter section and insuring maximum response sensitivity for said receiver.

5. In a selective communications receiver responsive to a carrier wave modulated by audio intelligence signals accompanied by a control tone; means for detecting and deriving said audio intelligence and control tone signals, means for amplifying the derived intelligence and operative only when a control potential is applied thereto, and circuit means for developing said control potential in response to a predetermined control tone signal, said circuit means including frequency selective means coupled to said receiver amplifying means, tone amplifying means coupled to said frequency selective means, filter network means coupled between said receiver detection means and said tone amplifying means, said filter network including a first section having a low pass characteristic for passing the control tone signals and a second section having a high pass characteristic for passing signals above the range of said audio intelligence signals, and high frequency gating means connected between said second filter section and a reference potential and further coupled to said receiver amplifying means, said tone amplifying means applying control tone signals of a reduced signal strength level to said frequency selective means in the presence of said high frequency signals from said second filter section, said frequency selective means producing and applying said control potential to said receiver amplifying means in response to a predetermined control tone signal, said receiver amplifying means responding to translate said audio intelligence signals and further actuating said high frequency gating means whereby said high frequency signals passed by said second filter section are bypassed to said reference potential, resulting in maximum response sensitivity for the receiver by increasing the amplification level on said control tone signals passed by said first filter section.

6. In a selective communications system, a receiver responsive to a carrier wave modulated by audio intelligence signals accompanied by an audio tone signal, said receiver including in combination; transistor detection means for deriving said audio intelligence and tone signals from said carrier wave, transistor audio amplifier means including transistor switch means to render same operative only upon the application of a control potential thereto, and circuit means for developing said control potential in response to a given control tone signal, said circuit means including filter network means having first and second sections, transistor tone amplifying means coupled to frequency selective means, and diode gating means coupled to said second filter section and ground and further coupled to said transistor audio amplifying means, said filter network being coupled between said transistor detection means and said transistor tone amplifying means with said first filter section passing said control tone signals and said second filter section passing signals above said audio intelligence signals, said transistor tone amplifying means applying control tone signals of reduced signal strength level to said frequency selective means in the presence of said signals passed by said second filter section, said frequency selective means producing and applying said control potential to said transistor switch means in response to a given control tone signal, said transistor audio amplifying means being responsive to translate said audio intelligence signals as well as applying a forward bias to said diode gating means whereby said signals passed by said second filter section are bypassed to ground, resulting in increased receiver response sensitivity by increasing the signal strength of said control tone signals in said transistor tone amplifying means.

7. In a selective communications receiver responsive to a carrier wave modulated by audio intelligence accompanied by an audio tone signal and having a discriminator for deriving said audio intelligence and tone signals, said receiver further having audio amplifying means for said demodulated intelligence including circuit means to render same conductive only upon application of a control potential thereto; a tone operated squelch circuit adapted to receive and develop said control potential in response to the desired audio tone signal, said tone operated squelch circuit including in combination, tone amplifying means for producing audio tone signals at a fixed level of amplification, filter network means coupled between said discriminator and said tone amplifying means, said filter network means including low pass filter means for passing frequencies within the range of the audio tone signals and high pass filter means for passing a portion of those frequencies above said audio intelligence signals, said frequencies passed by said high pass filter means thereby causing a reduction in the amplification on said frequencies passed by said low pass filter means that would otherwise obtain, high frequency noise gating means coupled between a reference potential and said audio amplifying means and further coupled to said high pass filter means, and a frequency selective device coupled between said tone amplifying means and said circuit means of said audio amplifying means, said frequency selective devices being adapted to produce a control potential in response to a predetermined audio tone signal from said tone amplfying means with means for applying same to said circuit means to render said audio amplifying means conductive to translate the derived audio intelligence thereby, said conduction of said audio amplifying means further causing the actuation of said high frequency noise gating means to bypass said frequencies passed by said high pass filter means to said reference potential, thereby increasing the amplification level on frequencies passed by said low pass filter means, resulting in maximum response sensitivity for said tone operated squelch circuit.

8. In a selective communications system, a receiver responsive to a carrier wave modulated by audio intelligence accompanied by a control tone signal, said receiver including in combination, discriminator means for deriving said audio intelligence and control tone signals, audio amplifying means including an electron discharge device coupled to said discriminator means, said discharge device including cathode, grid and plate electrodes and operative only upon application of a control potential to said cathode electrode to translate said audio intelligence signals from said grid electrode to said plate electrode thereof, and a tone operated squelch circuit including a frequency selective device responsive to a particular control tone signal and circuit means including a control valve responsive to operation of said frequency selective device for rendering said audio amplifying means operative, said tone operated squelch circuit further including tone amplifying means including first and second electron discharge devices with said second electron discharge device coupled to said frequency selective device, filter network means coupled between said discriminator means and said first electron discharge device in said tone amplifying means, said filter network means including a first portion for passing frequencies within the range of said control tone signals and a second portion for passing frequencies above said audio intelligence signals, and gating means including first and second diodes serially connected between a reference potential and said plate electrode of said discharge device of said audio amplifying means, said frequency selective device producing said control potential in response to a given control tone signal and applying the same to said cathode electrode of said discharge valve of said audio amplifying means whereby said valve is rendered conductive and current flows through said first and second diode to said plate electrode, whereby said diodes are rendered conductive to pass signals in said second filter portion to said reference potential, thereby increasing the level of control tone signals in said tone amplifier means to increase the sensitivity of said tone operated squelch circuit.

References Cited in the file of this patent

UNITED STATES PATENTS

| | | |
|---|---|---|
| 2,239,906 | Tuxen | Apr. 29, 1941 |
| 2,546,987 | Eannarino | Apr. 3, 1951 |